United States Patent Office 3,366,537
Patented Jan. 30, 1968

3,366,537
METHOD FOR COMBATING MICROORGANISMS WITH AN ALKYL SUBSTITUTED OXAZOLINE
Cyril Woolf, Morristown, N.J., assignor to Allied Chemical Corporation, New York, N.Y., a corporation of New York
No Drawing. Filed June 13, 1966, Ser. No. 556,875
6 Claims. (Cl. 167—33)

ABSTRACT OF THE DISCLOSURE

Microorganisms, especially bacteria, and particularly *Staphylococcus aureus*, are combated by treatment with an effective amount of an alkyl substituted oxazoline of the formula:

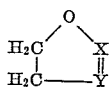

wherein X and Y are unalike and may be N or CR, wherein R is an alkyl group, or mixtures thereof. These alkyl substituted oxazolines belong to a known class of compounds and may be employed in the form of solutions, sprays, mists, dusts or preferably in vapor state.

---

Background and description of the invention

The problem of combating microorganisms, meaning in the context of this discussion killing and preventing or retarding the propagation of microorganisms, is common to a number of industries such as the food, agricultural and pharmaceutical industries, and is particularly significant to the medical profession. The usual methods of sterilization such as steam, heat, chemical solution, radiation, and the like, are impractical when large areas such as hospital rooms, laboratories and animal quarters are desired to be sterilized or when it is desired to sterilize delicate laboratory and medical equipment, which may contain plastics, fabrics, and the like, that may be adversely affected by moisture and heat.

The term sterilization is generally interpreted as referring to a condition in which a locus is freed from all living microorganisms as opposed to being freed only from certain microorganisms.

The problem of freeing a locus from all living microorganisms is no mean one because, although many varieties of microorganisms are relatively easy to combat, others have particularly high resistances to adverse conditions and are exceedingly difficult to combat. Such a microorganism is the bacteria *Staphylococcus aureus*. Unfortunately, such bacteria are commonly found in hospitals and food and are responsible for a large number of human fatalities every year. Because *Staphylococcus aureus* cells are so difficult to combat in comparison with other microorganisms, researchers have used these cells as standards for sterilization tests. It is presumed that, if a given chemical agent is effective in combating *Staphylococcus aureus* cells, it will be effective in combating other varieties of vegetative cells. The converse of this is, of course, not true. Experience has proved this to be the case. An illustrative standard test that is widely used is the so-called F.D.A. Method (Food and Drug Administration Method) as published by Ruehle and Brewer in 1931. (See Porter, Bacterial Chemistry and Physiology, John Wiley & Sons, Inc., N.Y. (1946), p. 226.) This method requires tests of disinfectant or antiseptic action to be carried out against strains of *Staphylococcus aureus*.

The problem of sterilizing large areas and of sterilizing heat- or water-sensitive materials has been alleviated by the use of antimicrobic agents in vapor phase. Effective vapor phase antimicrobic agents must be capable of being readily introduced into the vicinity of the area to be treated; of rapidly and thoroughly penetrating porous surfaces in the area; of effectively penetrating, while in vapor phase, the microorganisms to be treated, of destroying the microorganisms over a wide range of temperatures and humidities; and of permitting ready removal by aeration. Unfortunately, many chemical agents, while possessing good antimicrobic activity, are not capable of functioning effectively in vapor phase for lack of one or more of the above-noted requirements. Bactericidal agents, for example, which have high vapor pressures and may be vaporized easily, may still not possess the penetrability properties required for effective vapor phase use.

It is a major object of this invention to provide a novel method for combating microorganisms such as bacteria, fungi and the like.

It is another object of the invention to provide a novel method for effectively combating microorganisms such as bacteria, fungi and the like over a wide range of relative humidity conditions.

Yet another object of the invention is to provide a novel sterilization method.

It is a more particular object of the invention to provide a novel method for combating bacteria.

A still more specific object of the invention is to provide a novel method for combating *Staphylococcus aureus* cells.

A preferred object of the invention is to provide a novel method for combating microorganisms, particularly bacteria, in vapor phase.

The preferred, most specific object of the invention is to provide a novel method for combating *Staphylococcus aureus* cells in vapor phase.

It has been found that the above stated objects of the invention are accomplished by treating microorganisms, particularly *Staphylococcus aureus* cells, with an alkyl substituted oxazoline of the formula:

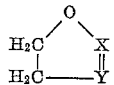

wherein X and Y are unalike and may be N or CR, wherein R is an alkyl group, preferably containing 1–4 carbon atoms inclusive, or mixtures thereof. A preferred subclass of alkyl substituted oxazolines as described above are those in which X represents the CR group and Y represents N. Such compounds have been found to exhibit extremely high activity at both high and low humidities. The novel antimicrobic agents of the invention will be referred to hereafter as "the subject oxazolines." In accordance with the preferred objects of the invention, the subject oxazolines may be used effectively in vapor phase.

The subject oxazolines are a known class of compounds. The subject oxazolines in which X represents the CR group and Y represents N may be prepared by standard techniques such as by dehydrohalogenating β-haloalkylamides with aqueous or alcoholic alkali as described at pp. 449–450 of an article by Wiley et al., entitled "The Chemistry of the Oxazolines," in Chemical Reviews, vol. 44 (1949). The subject oxazolines in which X represents N and in which Y represents the CR may also be prepared by conventional techniques such as by reacting ethylene with an alkyl nitrile oxide of the formula $RC \equiv NO$, wherein R is an alkyl group. Such a preparative technique is reported in "Advances in Heterocyclic Chemistry," vol. II (1963) at p. 375, Ed. Katritzky et al., Academic Press.

Illustrative of the oxazolines within the scope of the invention are the following:

2-methyl-2-oxazoline
2-ethyl-2-oxazoline
2-propyl-2-oxazoline
2-n-butyl-2-oxazoline
3-methyl-2-isoxazoline
3-ethyl-2-isoxazoline
3-propyl-2-isoxazoline
3-t-butyl-2-isoxazoline The subject oxazolines may be used to treat microorganisms by contacting the microorganisms to be treated, or surfaces containing the same, with the subject oxazolines in the form of solutions, sprays, mists, dusts, or in accordance with the preferred embodiment, in vaporous state. The subject oxazolines may be used alone or in admixture with vaporous, solid or liquid diluents such as air and water or hydrocarbon liquids, with or without any of the well-known anionic, cationic or nonionic surface-active wetting agents. Such agents include, for example, alkali metal salts of higher fatty acids, water-soluble salts of sulfated higher fatty alcohols, water-soluble aryl sulfonates, and quaternary ammonium bases such as trialkyl benzyl ammonium chloride. In the preferred vapor phase embodiment, a subject oxazoline may be conveniently employed such as by vaporizing it in a closed area in which the microorganism-containing surfaces to be treated are located or by using a vaporous diluent such as air which may be bubbled into the liquid oxazoline and then the oxazoline-laden air used to fumigate a closed space surrounding the microorganism-containing surfaces to be treated.

As is well known in this art, dosages of a given antimicrobic agent can vary widely depending upon the particular organism to be controlled, the area of the locus to be treated, the time in which control is desired to be established, and environmental conditions such as temperature, relative humidity, etc. In any event, sufficient concentrations of the subject oxazolines should be utilized in order to effectively combat the microorganisms to be treated, that is to say, in order to maximize the killing of existing living bacteria and the prevention of propagation of the same in the same locus for a significant period of time. The dosages that will be required in a particular case to accomplish these ends are readily ascertainable and are thus within the skill of the art.

The subject oxazolines can be employed as the sole active ingredient in combating microorganisms; however, if desired, they can be combined with active materials such as other antimicrobic agents or growth inhibitors to achieve special results or with nonactive components such as perfumes, propellant aids, and the like.

EXAMPLE

One-tenth ml. portions of 2-methyl-2-oxazoline, B.P. 110° C., were charged to one-liter flasks. Circular patches of cotton cloth, each having an area of about 2 cm.² and each impregnated with an aqueous suspension of about $5 \times 10^6$ Staphylococcus aureus cells and subsequently dried, were suspended by wires about halfway down into the flasks. The flasks were stoppered and the patches containing the bacteria were exposed to the 2-methyl-2-oxazoline vapors for a period of 1 hour. The exposures were conducted at room temperature (about 20-31° C.) and were duplicated in atmospheres of 48% and 90% relative humidity. Relative humidities in the bottles were elevated by flushing with air passed through water. At the end of the exposure periods, the patches were removed and assayed for viable organisms by the pour-plate method as follows: The patches were placed in dilution blanks composed of aqueous solutions of 0.1% lecithin v./v. and 0.71% Tween 80 (trademark of Atlas Powder Co. for an emulsifier comprising a polyoxyalkylene derivative of sorbitan monooleate) v./v. and adjusted to pH 7 with 1 N NaOH. Organisms remaining on the patches were dislodged by shaking and aliquots were plated in enriched nutrient agar. After incubating for 48 hours at 37° C., the percentage of organisms killed (attributable to the subject oxazoline test material) was calculated by comparison of the number found after testing with an assay of unexposed contaminant patches. Bacteria counts were made with a Quebec Colony counter. The average results of the above described tests are shown in the following table:

| Relative humidity (percent) | Percent bacteria kill |
|---|---|
| 48 | 100 |
| 90 | 100 |

As can be seen from the above results, 2-methyl-2-oxazoline was highly effective after only 1 hour of exposure with the microorganisms treated, both at high and low relative humidities.

I claim:

1. The method for combating microorganisms which comprises treating said microorganisms with an effective amount of an alkyl substituted oxazoline of the formula:

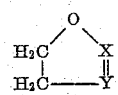

wherein X and Y are unalike and may be N or CR, wherein R is alkyl of 1 to 4 carbon atoms, or mixtures thereof.

2. The method of claim 1 in which the alkyl substituted oxazoline is 2-methyl-2-oxazoline.

3. The method of claim 1 in which the alkyl substituted oxazoline is employed in vapor phase.

4. The method of claim 1 in which the microorganisms treated are bacteria.

5. The method of claim 4 in which the bacteria are *Staphylococcus aureus* cells.

6. The method of claim 5 in which the alkyl substituted oxazoline is 2-methyl-2-oxazoline and in which such material is employed in vapor phase.

References Cited

Chemical Abstracts, Sixth Collective Index, volumes 51-55 (1957-1961), subjects Mi-Pk, pp. 8242s and 8243s.

ALBERT T. MEYERS, *Primary Examiner.*

J. GOLDBERG, *Assistant Examiner.*